Figure 1:
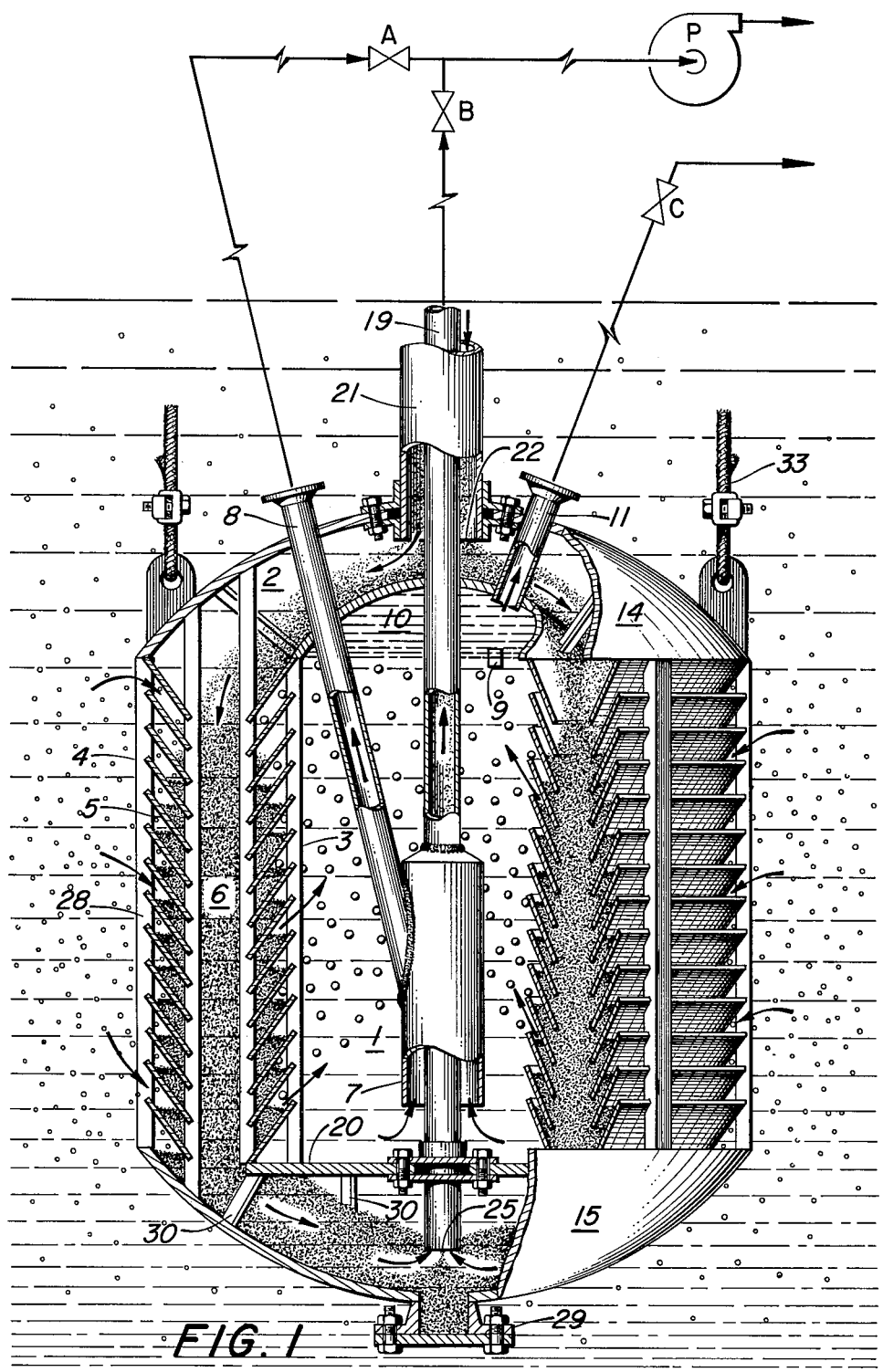

United States Patent [19]

Casad et al.

[11] 4,251,369

[45] Feb. 17, 1981

[54] RADIAL DESIGN SUBMERGED COALESCER FOR SEPARATION OF LIQUIDS

[75] Inventors: Burton M. Casad; R. Leroy Grimsley, both of Ponca City, Okla.

[73] Assignee: Conoco, Inc., Ponca City, Okla.

[21] Appl. No.: 47,400

[22] Filed: Jun. 11, 1979

[51] Int. Cl.³ .............................................. B01D 17/04
[52] U.S. Cl. .................................... 210/104; 210/115; 210/264; 210/307; 210/317; 210/505; 210/DIG. 5
[58] Field of Search ............... 210/112, 114, 115, 189, 210/23 R, 264, 265, 307, 317, 493, 505, 508, DIG. 5, 103, 104

[56] References Cited

U.S. PATENT DOCUMENTS

| 3,187,895 | 6/1965 | Poll et al. | 210/DIG. 5 |
| 4,011,158 | 3/1977 | Cook | 210/23 R |

Primary Examiner—S. Leon Bashore
Assistant Examiner—Ferris H. Lander
Attorney, Agent, or Firm—Cortlan R. Schupbach, Jr.

[57] ABSTRACT

A coalescer is provided which separates dispersed liquid hydrocarbon phases from continuous liquid aqueous phases by increasing the size of the dispersed phase droplets using a variety of coalescing media, preferably in granular form. The coalescer must contain at least three sides; however any number of sides up to a circle can be used, and a circular cross-section is preferred. Untreated aqueous phase is drawn through the coalescer media, where the dispersed droplets increase in size. The dispersed droplets are coalesced to a sufficiently large degree to rise to the top of the coalescer against the downward flow of the continuous phase, said continuous phase being withdrawn from the bottom portion of the coalescer and the separated, previously dispersed phase withdrawn from the top of the coalescer.

6 Claims, 1 Drawing Figure

RADIAL DESIGN SUBMERGED COALESCER FOR SEPARATION OF LIQUIDS

This invention relates to a submerged coalescer for the separation of hydrocarbons from aqueous phases. More particularly, this invention relates to a submerged coalescer allowing hydrocarbon droplets dispersed in aqueous phases to coalesce and rise against the downward pull of the removed, separated aqueous phase.

Coalescers are known for separating dispersed immiscible fluids. These apparatus find use in separating hydrocarbons from aqueous phases in industrial products and for removing water from hydrocarbon phases in petrochemical facilities. However, such coalescers have normally been of complex internal design, are not susceptible to maintenance, and generally do not allow ease of operation. In addition, many use fixed coalescer media with flow patterns which do not encourage separation.

Representative but non-exhaustive of the prior art is U.S. Pat. No. 4,053,414 which separates coalesced liquids from a liquid medium. The apparatus described in this reference uses a thick coalescer media and has flow patterns which are complicated. U.S. Pat. Nos. 3,948,768 and 3,948,767 use unconfined media and separate coalesced liquids. U.S. Pat. No. 4,011, 158 uses a granular media and separates oil and water. U.S. Pat. Nos. 3,830,371; 3,972,816; 3,144,407; 3,738,492; and 4,058,463 all perform coalescing operations that have various structural and flow scheme drawbacks.

It is therefore an object of the present invention to provide a submerged coalescer for separation of entrained hydrocarbons from aqueous continuous media, while not occupying space in space critical applications. Other objects will become apparent to those skilled in this art as the description proceeds.

It has now been discovered according to the instant invention that these objects are met by coalescer apparatus which separates dispersed liquid hydrocarbon phases from continuous liquid aqueous phases by increasing the size of the dispersed phase droplets using particulate coalescer media, said coalescing taking place by drawing untreated aqueous phase containing hydrocarbon phase through the coalescer media wherein the dispersed hydrocarbon droplets increase in size to a degree sufficient to rise to the top of the coalescer against the downward flow of the continuous phase, said continuous phase then being withdrawn from the bottom portion of the coalescer and the separated, previously dispersed hydrocarbon phase withdrawn from the top of the coalescer.

There is a pressing need for the separation of dispersed insoluble liquids such as oil-in-water emulsions. Low level oil-in-water emulsions are needed to meet discharge standards and injection well standards in the petroleum industry. Coalescers are very effective separation devices and normally operate by increasing the size the dispersed phase droplets. The media is thus normally wetted by the dispersed phase, while the enlarged droplets separate into a distinct layer which can be easily removed. The quality of the continuous phase is increased by removal of the dispersed phase.

The present invention likewise provides an efficient backwashing function when coalescer media becomes contaminated with entrained particulate matter. Such an option is urgently needed for most coalescing materials.

Therefore the instant invention provides a coalescer for separating entrained hydrocarbons from aqueous media, said coalescer being submerged in said continuous media, comprising
  (a) an inner chamber having an outer wall,
  (b) an outer chamber surrounding said inner chamber and having an outer wall, the inner wall of said outer chamber being common with said outer wall of inner chamber, said walls being formed of retaining means,
  (c) said retaining means being capable of retaining particulate coalescing materials in said outer chamber while allowing fluid communication from said aqueous media through the outer chamber and into said inner chamber,
  (d) sensing means for detecting the level of an upper hydrocarbon layer in said inner chamber, said means being connected to
  (e) means for removing said upper hydrocarbon layer, and together with said sensing means, capable of maintaining a fixed volume of upper hydrocarbon layer, and
  (f) an axially aligned conduit for removal of aqueous media from which substantially all hydrocarbons have been removed.

The invention also comprises a backwash function in an optional embodiment which allows washing or replacement of the coalescing media in order to remove blockage caused by impurities or materials absorbed thereon. Thus the coalescer has the advantage of less weight and allows the backwashing function in order to replace or wash the coalescing media.

Representative examples of coalescing media which can be used in the invention described herein of those normally used, such as resins, glass beads, oyster shells, walnut shells, anthracite coal and sand. Charcoal is a preferred coalescing media.

The coalescer is normally submerged in the media which contains the entrained hydrocarbon. The coalescer could, of course, be placed in a shell and the aqueous phase containing entrained hydrocarbon pumped through the shell and thus through the coalescer, but many advantages will be lost when such use is employed. The coalescer can be submerged in any aqueous environment such as a tank, vessel or even open bodies of water such as ponds, lakes, and even the ocean when concentrations are sufficiently high.

The invention is more concretely described with reference to the drawing wherein the instant invention is exemplified in a preferred embodiment.

FIG. 1 shows the general structure of the coalescers of the instant invention.

Specifically described, FIG. 1 is a cutaway cross sectional view, comprised of an inner chamber (1) having an outer wall (3); an outer chamber (2) surrounding said inner chamber and having an outer wall (4); the inner wall (3) of said outer chamber being common with said outer wall (3) of said inner chamber; retaining means (5) for retaining particulate coalescer media (6) in said outer chamber, said retaining means allowing fluid communication from fluid in which the coalescer is immersed through said retained particulate coalescer media (6) which is in the outer chamber (2) into said inner chamber (1); recovery means (7) disposed within said inner chamber in a vertical position and exiting said inner chamber through exit means (8); a sensing means (9) for detecting an oil-water interface and thus determining the level of a separated hydrocarbon phase (10)

which is recovered through line 11 which penetrates into the inner chamber of said coalescer.

Preferably, the retaining means (5) which comprise the inner and outer walls of the outer chamber are vertically aligned, frustro conical members set at opposing angles of from about 50° to about 70°, preferably about 60°, to retain the particulate coalescing media (6). Likewise, the apparatus which comprises the inner and outer chambers has fluid-impermeable partitions (14) at the upper end and lower end (15) of the apparatus. The aqueous recovery means (8) will penetrate through either or both of these fluid-impermeable means to the inner chamber for the recovery of hydrocarbon-free fluid. A sensing device (9) provides a constant level of hydrocarbon for withdrawal through exit means (11).

In order to provide a means for backwashing the coalescing apparatus to remove collected particles and blockages from the coalescing media, a cylindrical member (19) is axially aligned with said fluid-impermeable end portions (14) and (15) of the inner and outer chambers, said cylindrical member (19) penetrating the lower end of said inner impermeable housing (20), then the upper fluid-impermeable ends of both the inner (1) and outer (2) chambers. The cylindrical portion is thereafter surrounded by a housing (21) affixed to an aperture (22) of the upper fluid-impermeable end (14), said housing (21) allowing return of clean coalescing media into the outer chamber (2) through an annulus between the cylindrical member (19) and the housing (21).

When in operation, a valve (A) will be in a desired open position to allow the passage of hydrocarbon-free water to disposal or use as desired. A second valve (C) will likewise be in an intermittent open operation dependent upon the level of hydrocarbon detected by sensor (9). A third valve (B) would be closed. Valve A would be connected to a pump apparatus which would remove contaminant-free water through suction, thus drawing fluid through the particulate coalescing media (6) passing first through the outer wall of the outer chamber (4) through the particulate media (6) contained in the outer chamber (2) and thence through the inner wall of the outer chamber (3) which comprises the outer wall (3) of the inner chamber (1). The fluid so passing through the filter has entrained hydrocarbon media collected upon the coalescing media (6) which subsequently separates under the force of fluid flowing through the outer chamber into large droplets which rise against the downward suction of the water to the top of the inner chamber (1). The force is adjusted so as to allow the droplets which coalesce to rise. Intermittently, the sensor (9) detects the level of hydrocarbon which then actuates a pump connected to open valve C and removes hydrocarbon (10) from inner chamber (1). The pump force is simply adjusted to a rate which allows adequate separation to occur.

If the coalescing media (6) becomes clogged or partially clogged by solid contaminants from surrounding fluid, valves A and C are closed and valve B is opened and suction applied thereto. Sufficient suction is applied such that filter media (6) is drawn through the lower opening (25) of axially aligned member (19) and thus removed from the apparatus. Filter media is then replaced through the annulus between axially aligned member (19) and housing (21) attached to the upper impermeable end (14). The returning filter media falls onto the top of the housing of the inner chamber and thus into the retaining means (5) which hold it in position in preparation for reuse. At the conclusion of replacement or cleaning, valve B is closed and valves A and C are returned to their original operating configurations.

The apparatus contains supporting means (28) to maintain the coalescer media retaining means (5) in the desired position. These supporting means (28) are usually strong enough to support the weight of the apparatus when suspended in a vessel or body of fluid. In addition, the apparatus can optionally be provided with a combination support and/or cleanout trap (29). In addition, the apparatus is provided with various bracing means (30) to provide sufficient internal support while allowing fluid communication of the coalescing media (6) with the entrance (25) to the axially aligned cylinder (19) which passes through the inner chamber (1).

Coalescer of the instant invention is simple, adaptable, and effective in the treatment of a wide range of effluent liquids. The coalescer is designed to be submerged in an existing vessel or body of water. The pump powering the coalescer is normally positioned downstream from the coalescer to reduce emulsions produced by the pump. Further dispersion of the dispersed phase into more droplets is clearly undesirable. However, the pump can be placed upstream from the coalescer if desired or necessary. Gravity alone could be used to force liquid through the coalescer, should the outer shell be constructed with sufficient strength to withstand the liquid head force. The pressure differential ($\Delta P$) across the coalescer media bed will be absorbed as compressive forces against the coalescer media.

The coalescer of the instant invention is preferably radial in design and will allow separation of dispersed hydrocarbon phase from continuous aqueous phase by increasing the size of the dispersed hydrocarbon phase droplets. However, the same principle will apply so long as there are at least three sides. As the number of sides increases, the shape naturally approaches a circle, which is the desired configuration.

The instant coalescer offers many advantages over the prior art. The construction and operation are simple and the pressure head across the coalescer media is absorbed by compressive forces on the media and not the coalescer shell itself. A large surface area is available and a partial backwash can expose new surface if a portion of the coalescer media first contacted becomes clogged. This allows better coalescence and higher load capacity. The apparatus provides a simple, effective backwash to allow the coalescer media to be reused or replaced. The coalescer can be inserted into existing vessels such as skim tanks without extensive preparation. The pump powering the coalescer is preferably downstream from the coalescer which prevents further dispersion of the dispersed hydrocarbon phase. The velocity change of the liquid as it passes through the media can be adjusted as desired, allowing improved coalescence and separation. In addition, the liquid can be forced through the coalescer from outside toward the center or from the center toward the outside as desired meaning only a shifting of valves in order to operate. The coalescer allows the option of directing the total stream into a separate settling tank or can operate as shown in the preferred embodiment.

The coalescer is normally suspended in the continuous media by suspending means (33) although it can rest upon the support means (29) if desired.

Common sense dictates that the coalescer be placed where suspended solids are at a minimum. In tanks this intake would usually be found in an intermediate depth between the surface of the tank or body of water and the bed or bottom thereof. The fluid near the surface is usually agitated such that separation is more difficult while fluid near the bottom of the body of water or tank is usually high in suspended solids. A suction pump on the outlet side of the coalescer results in better coalescence since the material to be coalesced avoids the very turbid conditions of a pump. Centrifugal pumps and high velocity pumps are examples of agitation which increase the difficulty of coalescence which in effect is avoided with the apparatus of the instant invention.

Thus, it is apparent that the instant coalescer provides a method of avoiding weight problems, has high utility and provides a means for regenerating clogged or inoperative coalescing media without removing or opening the apparatus itself.

While certain embodiments and details have been shown for the purpose of illustrating this invention, it will be apparent to those skilled in this art that various changes and modifications may be made herein without departing from the spirit or scope of the invention.

We claim:

1. A coalescer for separating entrained aqueous hydrocarbons from aqueous media, said coalescer being submerged in said media, comprising
   (a) an inner chamber having an outer wall,
   (b) an outer chamber surrounding said inner chamber and having an outer wall, the inner wall of said outer chamber being common with said outer wall of said inner chamber, said walls formed of retaining means said means being vertically aligned frusto-conical members set at opposing angles;
   (c) said retaining means retaining particulate coalescing materials in said outer chamber while allowing fluid communication from said aqueous media through the outer chamber and into said inner chamber,
   (d) sensing means for detecting the level of an upper hydrocarbon layer in said inner chamber, said means being connected to
   (e) means for removing said upper hydrocarbon layer and together with said sensing means capable of maintaining a fixed volume of upper hydrocarbon layer, and
   (f) a conduit for removal of aqueous media from which substantially all hydrocarbons have been removed.

2. A coalescer as described in claim 1 wherein both inner and outer chambers have fluid impermeable partitions at the upper and lower ends and wherein output means are in fluid communication with the inner chamber.

3. A coalescer as described in claim 2 wherein a cylindrical portion is axially aligned with said fluid impermeable end portions of the inner and outer chambers, said cylindrical portion penetrating the lower end of said inner chamber fluid impermeable housing and the upper fluid impermeable ends of both the inner and outer chambers, said cylindrical portions surrounded by housing affixed to the entrance of the upper fluid impermeable end of said outer chamber, said housing forming an annulus between the cylindrical portion and the housing, said annulus connecting only with the outer chamber and not accessible to the inner chamber except through the frustro conical members forming the inner wall of the outer chamber and the outer wall of the inner chamber, said cylindrical portion being connected to a switching valve at the upper end.

4. A coalescer as described in claim 3 wherein said switching valve is closed when aqueous recovery means and hydrocarbon recovery means are in operation.

5. A coalescer as described in claim 4 wherein the inner chamber is provided with a sensing means for detecting a hydrocarbon water interface, said sensing means being connected to a pump means for removing hydrocarbon and thus maintaining a desired volume of hydrocarbon in the upper end of said inner chamber.

6. A coalescer as described in claim 5 wherein the particulate coalescing materials are selected from the group consisting of resins, glass beads, oysters shells, walnut shells, anthracite coal, sand and charcoal.

* * * * *